(12) United States Patent
Schneyer et al.

(10) Patent No.: US 12,615,317 B2
(45) Date of Patent: Apr. 28, 2026

(54) INTERACTIVE CUSTOMIZED PUSH NOTIFICATIONS WITH CUSTOMIZED ACTIONS

(71) Applicant: Salesforce, Inc., San Francisco, CA (US)

(72) Inventors: Joshua Schneyer, Monrovia, CA (US); Nitish Khadiya, Sunnyvale, CA (US); Aleksandra Zhulina, Woodland Hills, CA (US); Erik Forsberg, Los Angeles, CA (US); Nadia Nusrat, Brookhaven, GA (US); Allan George Thomas, Hayward, CA (US); Senthilkumar Kosanam Shanmugam, Santa Clara, CA (US)

(73) Assignee: Salesforce, Inc., San Francisco, CA (US)

( * ) Notice: Subject to any disclaimer, the term of this patent is extended or adjusted under 35 U.S.C. 154(b) by 542 days.

(21) Appl. No.: 16/264,292

(22) Filed: Jan. 31, 2019

(65) Prior Publication Data

US 2020/0099759 A1 Mar. 26, 2020

Related U.S. Application Data

(60) Provisional application No. 62/735,573, filed on Sep. 24, 2018.

(51) Int. Cl.
H04L 67/55 (2022.01)
H04L 41/06 (2022.01)
H04L 67/306 (2022.01)

(52) U.S. Cl.
CPC .............. H04L 67/55 (2022.05); H04L 41/06 (2013.01); H04L 67/306 (2013.01)

(58) Field of Classification Search
CPC ........ H04L 67/26; H04L 41/06; H04L 67/306
USPC ......................................................... 709/217
See application file for complete search history.

(56) References Cited

U.S. PATENT DOCUMENTS

| | | | |
|---|---|---|---|
| 6,505,246 B1 | 1/2003 | Land et al. |
| 8,291,490 B1 | 10/2012 | Ahmed et al. |
| 8,321,921 B1 | 11/2012 | Ahmed et al. |
| 8,706,800 B1 | 4/2014 | Ahmed et al. |
| 10,382,445 B1 | 8/2019 | Mantel et al. |
| 10,540,063 B2 | 1/2020 | Firstenberg et al. |

(Continued)

OTHER PUBLICATIONS

Arya, Pradeep Kumar, V. Venkatesakumar, and S. Palaniswami. "Configurability in Saas for an electronic contract management application." Recent Advances in Networking, VLSI and Signal Processing (2010): 210-216. (Year: 2010).

(Continued)

*Primary Examiner* — Vivek Srivastava
*Assistant Examiner* — Hien V Doan
(74) *Attorney, Agent, or Firm* — Sterne, Kessler, Goldstein & Fox P.L.L.C.

(57) ABSTRACT

Disclosed herein are apparatus, system and method embodiments for sending an interactive customized push notifications with customized actions. An embodiment operates by determining occurrence of an event associated with an object, forming a notification and a list of actions defined by a customer using fields from the object associated with the event, and presenting the notification and the actions to a user device that's associated to the object. Further, the action is executed in response to the user's selection.

20 Claims, 5 Drawing Sheets

(56) References Cited

U.S. PATENT DOCUMENTS

| | | |
|---|---|---|
| 2001/0034769 A1 | 10/2001 | Rast |
| 2006/0117336 A1 | 6/2006 | Dolgin |
| 2008/0133812 A1 | 6/2008 | Kaiser et al. |
| 2010/0198730 A1 | 8/2010 | Ahmed et al. |
| 2010/0241696 A1 | 9/2010 | Matoba |
| 2010/0325281 A1 | 12/2010 | Li et al. |
| 2011/0213870 A1 | 9/2011 | Cai et al. |
| 2012/0084663 A1 | 4/2012 | Momchilov et al. |
| 2012/0102153 A1* | 4/2012 | Kemp ................. G06F 16/9535 709/219 |
| 2012/0173483 A1 | 7/2012 | Hartig et al. |
| 2012/0173581 A1 | 7/2012 | Hartig et al. |
| 2012/0174085 A1 | 7/2012 | Driesen et al. |
| 2012/0174113 A1 | 7/2012 | Pohlmann |
| 2013/0054714 A1 | 2/2013 | Bedi |
| 2013/0091229 A1* | 4/2013 | Dunn ...................... H04L 67/22 709/206 |
| 2013/0174275 A1* | 7/2013 | Micucci .................. H04L 63/10 726/28 |
| 2013/0198652 A1 | 8/2013 | Dunn et al. |
| 2013/0325790 A1 | 12/2013 | Srinivasan |
| 2013/0346521 A1* | 12/2013 | Arabo ..................... H04L 67/61 709/206 |
| 2014/0040861 A1 | 2/2014 | Kim et al. |
| 2014/0215595 A1 | 7/2014 | Prasad et al. |
| 2014/0278716 A1 | 9/2014 | Nix et al. |
| 2014/0359476 A1 | 12/2014 | Wakeford et al. |
| 2014/0372539 A1 | 12/2014 | Zaveri |
| 2014/0376410 A1 | 12/2014 | Ros et al. |
| 2015/0019305 A1 | 1/2015 | Gorawala |
| 2015/0127819 A1 | 5/2015 | Cimino et al. |
| 2015/0207893 A1 | 7/2015 | Lee |
| 2015/0212675 A1 | 7/2015 | Firstenberg et al. |
| 2015/0288637 A1 | 10/2015 | Celikyilmaz et al. |
| 2016/0212020 A1 | 7/2016 | Gupte et al. |
| 2016/0217500 A1 | 7/2016 | Brigham |
| 2016/0217501 A1 | 7/2016 | Brigham |
| 2017/0149720 A1 | 5/2017 | Castagna et al. |
| 2017/0180499 A1 | 6/2017 | Gelfenbeyn et al. |
| 2017/0192773 A1 | 7/2017 | Trevathan et al. |
| 2017/0316216 A1 | 11/2017 | Kim |
| 2017/0329467 A1 | 11/2017 | Chen et al. |
| 2017/0329478 A1 | 11/2017 | Chen et al. |
| 2018/0103004 A1 | 4/2018 | Demir et al. |
| 2018/0146013 A1 | 5/2018 | Moreau et al. |
| 2018/0288178 A1 | 10/2018 | Gupta |
| 2018/0316552 A1 | 11/2018 | Subramani Nadar et al. |
| 2018/0373574 A1 | 12/2018 | Hargrove et al. |
| 2019/0034403 A1 | 1/2019 | Pal et al. |
| 2019/0034982 A1 | 1/2019 | Kulp et al. |
| 2019/0166213 A1 | 5/2019 | Hobson et al. |
| 2019/0253457 A1 | 8/2019 | Koul et al. |
| 2019/0286711 A1 | 9/2019 | Terry et al. |
| 2019/0286712 A1 | 9/2019 | Terry et al. |
| 2019/0286713 A1 | 9/2019 | Terry et al. |
| 2020/0019289 A1 | 1/2020 | Firstenberg et al. |
| 2020/0084295 A1 | 3/2020 | Hayward et al. |
| 2020/0285464 A1 | 9/2020 | Brebner |
| 2020/0285788 A1 | 9/2020 | Brebner |
| 2020/0285855 A1 | 9/2020 | Brebner |
| 2020/0285912 A1 | 9/2020 | Brebner |
| 2020/0285977 A1 | 9/2020 | Brebner |

OTHER PUBLICATIONS

T. Kwok, T. Nguyen and L. Lam, "A Software as a Service with Multi-tenancy Support for an Electronic Contract Management Application," 2008 IEEE International Conference on Services Computing, Honolulu, HI, 2008, pp. 179-186, doi: 10.1109/SCC .2008.138. (Year: 2008).

* cited by examiner

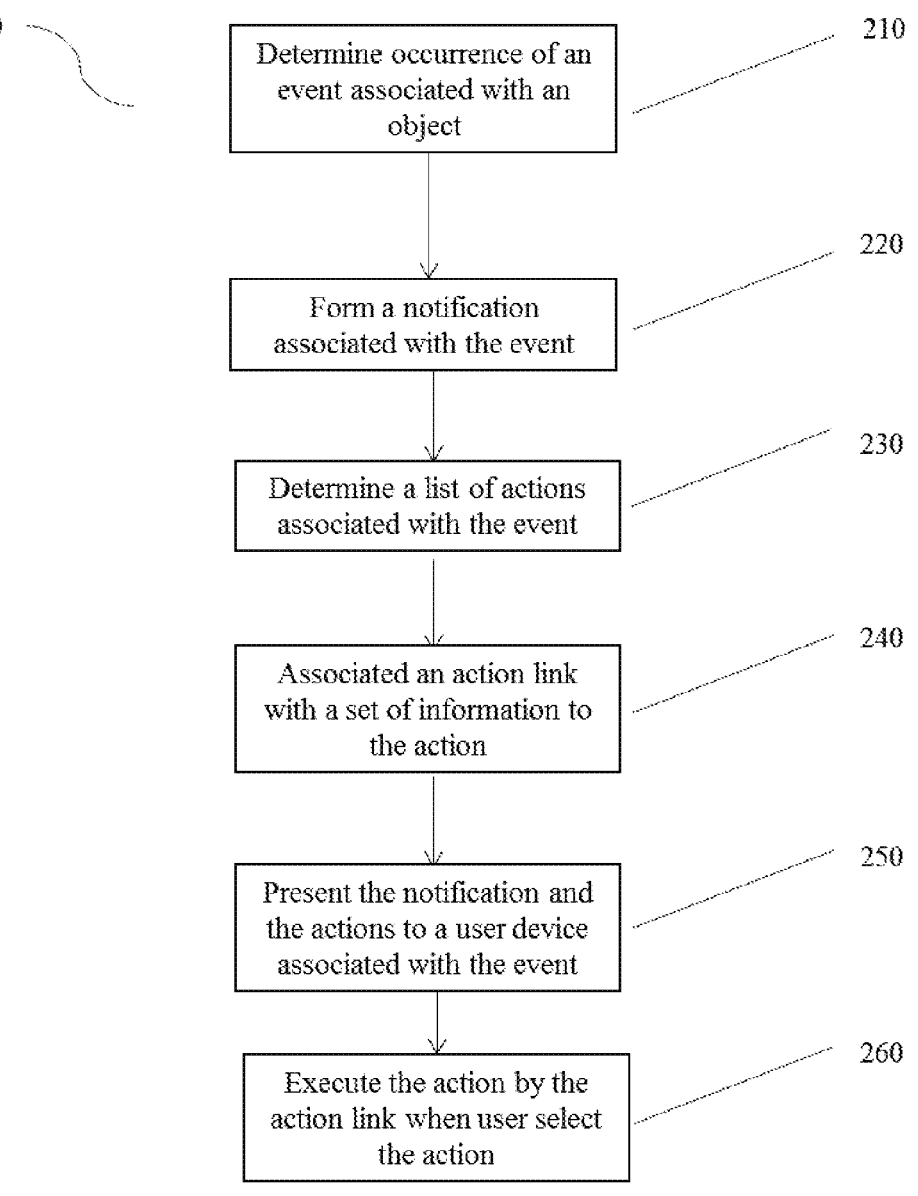

200

Determine occurrence of an event associated with an object — 210

Form a notification associated with the event — 220

Determine a list of actions associated with the event — 230

Associated an action link with a set of information to the action — 240

Present the notification and the actions to a user device associated with the event — 250

Execute the action by the action link when user select the action — 260

FIG. 2

User device 430

Notification 431

Action 1 433

Action 2 435

• • •

Action n 437

9:41 AM

02:15

SALESFORCE    now

Important notice
Solar panel malfunction at
Living Blue account
Press for more

Call Jennifer West

Order replacement part

410

411
413
415

INTERACTIVE CUSTOMIZED PUSH NOTIFICATIONS WITH CUSTOMIZED ACTIONS

BACKGROUND

Push notifications are inherent, out-of-the-box capabilities for many mobile and desktop applications. And these notifications are intended for reminders, alerts, and other usages. Some notifications also have actions associated with them, which could help users to respond to the notification, such as confirming, postponing, forwarding, etc. These notifications and actions are preset within the application and the options of the actions are the same for every user of the application. These can be modified, but only by deploying a new version of the application that provides new notifications and actions.

BRIEF DESCRIPTION OF THE DRAWINGS

The accompanying drawings are incorporated herein and form a part of the specification.

FIG. 2 is a flowchart example for sending an interactive customized push notifications with customized actions to a user device, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, method and/or computer program product embodiments, and/or combinations and sub-combinations thereof, for sending interactive customized push notifications with customized actions.

Conventional push notifications and appended actions have several limitations for mobile and desktop applications. First, conventional push notifications are usually default for the applications, and it can't be defined according to different customer's need. As an admin, the customers are previously not allowed to send customized push notifications to users. For example, the users could receive push notifications that someone is mentioned in one application, or something needs one user's approval. And these are inherent, out-of-the-box capabilities for these applications and the push notifications can't be customized for the users by the admin.

Second, conventional append actions for the push notifications are predefined in the application, and they cannot be customized by the admin. Users of the application could only choose from a limited list of predefined actions in response to the push notifications. For example, after the user gets a push notification of an event reminder, the appended actions could be confirming, postponing 5, 10 or 15 minutes, or even forwarding of the reminder. The admin or the end user can't customize these options.

Third, conventional push notifications and appended actions can't be customized and sent to specific group of users by the admin. The push notifications would usually be sent to the users that subscribed to some service, and the predefined actions would be appended to the push notifications. But the admin would not be able to customize and send to a specific group of users the push notifications and appended actions already defined by the subscribed service of the application. Finally, if new push notifications and new options of appended actions are needed, a new version of the application needs to be deployed on user's device. For example, if another option of calling some for the appended actions of an event reminder is needed to add to the option list, the application needs to update to include that new option for the appended actions.

Figure 1:
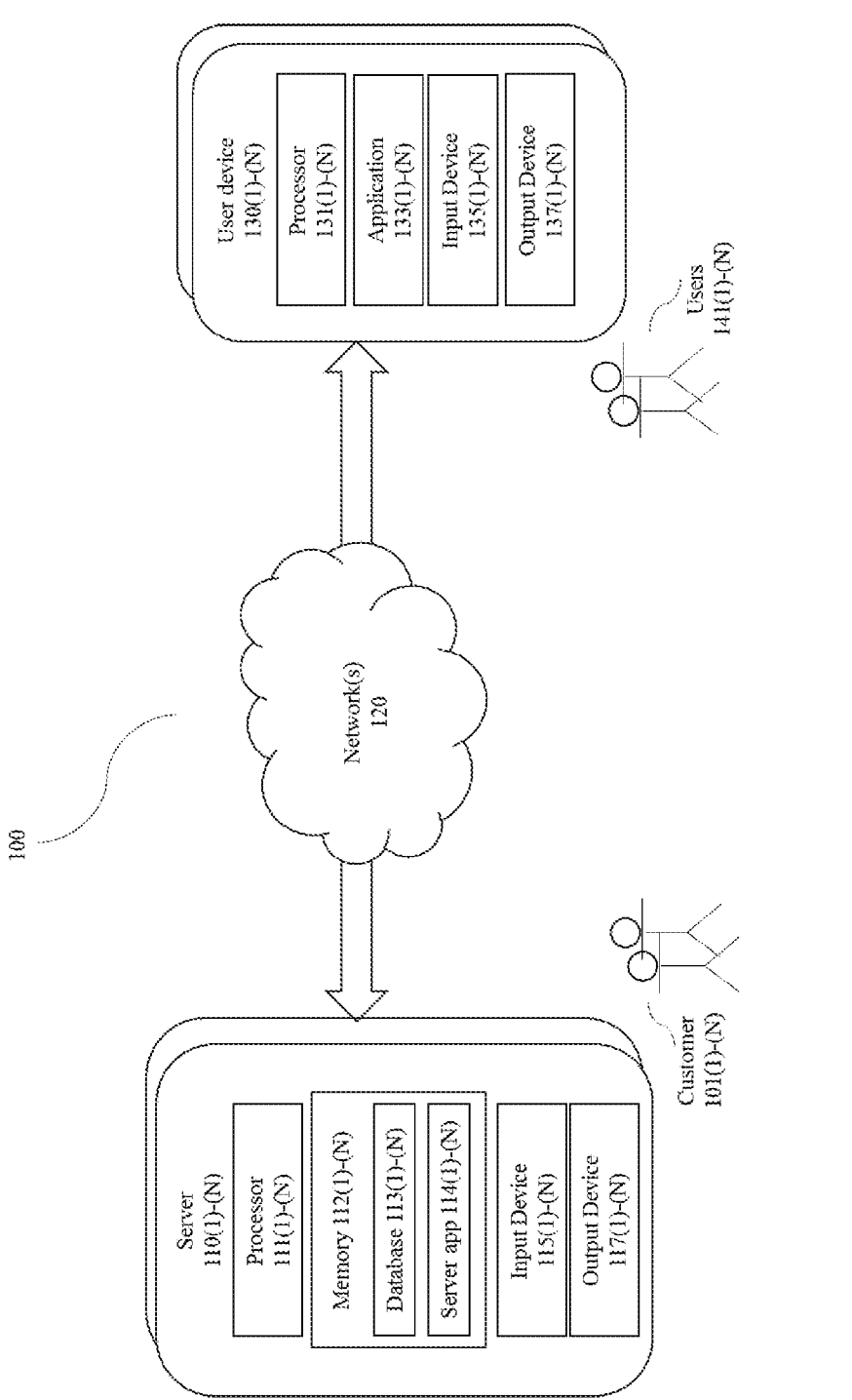
FIG. 1 illustrates a block diagram of an example framework for sending an interactive customized push notifications with customized actions to a user device, according to some embodiments.

FIG. 1 illustrates a block diagram 100 of an example framework for sending interactive customized push notifications with customized actions, which solves the limitations for conventional push notifications and actions, according to some embodiments. As illustrated in FIG. 1, system 100 includes server 110 associated with customer 101, which is any of one or more servers 110(1)-(N) associated with any of one or more customers 101(1)-(N), network(s) 120, and user device 130 associated with user 141, which is any of one or more user devices 130(1)-(N) associated with any of one or more users 141(1)-(N). As referred to herein, a server may include a hardware and/or software framework dedicated to the execution of procedures (e.g., programs, routines, scripts). In some embodiments, the servers could also be a cloud based computing system.

In some embodiments, Server 110 can be implemented as one server or can be distributed as any suitable number of servers, as illustrated in FIG. 1. For example, multiple servers 110 can be implemented in various locations to increase reliability, function of the application, and/or the speed at which the server can communicate with the user devices 130. In some embodiments, multiple customers 101 have shared access to a given server of servers 110, such as a server 110(1), each with their respective users 141 and view of server 110(1), in what is termed a multi-tenant configuration. And in some embodiments, servers 110 together could form a customer relationship management (CRM) system for managing all the company's relationships and interactions with customers and potential customers. For example, customer 101(1) and customer 102(2) (i.e. tenants of the multi-tenant server 110(1)), each acting as administrators, could both access the same multi-tenant server 110(1). But the content and configuration that customer 101(1) could access is different from customer 102(2) on the multi-tenant server 110(1). And customer 101(1) and 102(2) could manage their own relationships and interactions with their users independently through multi-tenant server 110(1). It should be understood that the customers could be more and not limited to two, each operating separately from others on multi-tenant server.

Server 110(1) can include hardware processor 111, memory 112, input device 115, and output device 117, which can be interconnected. Processor 111 can send and receive data and commands to and from one or more of user devices 130 through the output device 117 and input device 115. In some embodiments, memory 112 could include a storage device for storing in database 113 data related to customer 101 and user 141, as well as data received from user devices 130 related to users 141 through network(s) 120. In some embodiments, database 113 may be a multi-tenant database system. As used herein, the term "multi-tenant database system" refers to those systems in which various elements of hardware and software of the database system may be shared by one or more customers 101. For example, server 110(1) may simultaneously process requests for customer 101(1) and customer 101(2) (i.e. tenants), to access a multi-tenant database table 113(1) of the server 110(1) having data stored for the customers 101(1) and 101(2). The same multi-tenant database table 113(1) could provide separate data for customer 101(1) and 102(2), simultaneously and respectively.

As used herein, the term "database" refers to an organized collection of data. In some embodiments, a database may include a plurality of data tables comprising data values (e.g., alphanumeric strings, integers, decimals, floating points, dates, times, binary values, Boolean values, and/or enumerations). Some examples of databases include columnar databases, relational databases, key-store databases, graph databases, and document stores.

The storage device in memory 112 can further include server application 114. In some embodiments, the server 110 may host the server application 114 which support the user applications 133 on user device 130. For example, the first server application 114(1) may provide remote resources to the first user application 133(1), and the second server application 114(2) may provide remote resources to the second embedded application 133(2). In some other examples, the first server application 114(1) may provide remote resources to both the first user application 133(1) and the second user application 133(2). Some examples of remote resources include data storage, application programming interfaces (API), security modules, and/or distributed processing. In another example, the server application 114 may be same as user application 133, with additional administrator controls over the content, application, and/or functions accessible by a customer. The storage device can also include a serve program for controlling processor 111.

Referring to FIG. 1, user device 130(1) can include processor 131, input device 135, output device 147 and application 133, which can be interconnected. Processor 131 can use the computer program, for example, application 133, to present data received from server 110 through network(s) 120 on output device 137, with an input device 135 that allows a user to interact with application 133. Input device can be a computer keyboard, a mouse, a trackball, a keypad, a remote control, a touch screen that can receive input (e.g. using a finger, a stylus, or the like), any other suitable input device, or any suitable combination thereof. In some embodiments, the application can include client-side software, server-side software, hardware, firmware, or any suitable combination thereof. For example, a user's mobile device could receive push notifications and appended actions from a server through mobile communication network. And one application on user's mobile device could present the push notifications and appended actions on the screen of the mobile device. The user could respond to the push notifications by selecting one of the appended actions on the screen.

Further, the user devices 130 may be associated with a plurality of users 141. For example, the first user device 130(1) is associated with a first user 141(1), the second user device 130(2) is associated with a second user 141(2), and the Nth user device 130(N) is associated with an Nth user 141(N), and so forth. Multiple user devices 130 could also be associated with one of the users, for example 141(1), or one of the user devices, for example 130(1), could be associated with multiple users 141. Similarly, application 133 may be associated with a plurality of user 141. For example, the first application 133(1) is used by a first user 141(1), the second application 133(2) is used by a second user 141(2), and the Nth application 133(N) is used by an Nth user 141(N), and so forth. Multiple applications 133, could be used by one of the users, for example 141(1), or one of the application, for example 133(1), could be used by multiple users 141. In addition, the servers 110 may be associated with a plurality of customers 101. For example, the first server 110(1) is associated with a first customer 101(1), the second server 110(2) is associated with a second customer 101(1), an Nth server 110(N) is associated with an Nth customer 101(N), and so forth. Multiple servers 110 could also be associated with one of the customers, for example 101(1), or one of the servers, for example 110(1), could be associated with multiple customers 101. For example, one user may have multiple devices, such as a smart phone, a smart watch, and a smart pad, with the same application on them. When the user received the notification and appended actions from the server, the application will display the notifications and appended actions on the screens of all the user's devices. The user could respond to the notifications and select the action on either of his smart phone, smart watch, or smart pad.

In one embodiment, for example, a multi-tenant server 110(1) (e.g., cloud-based system) is associated with customers 101(1) and 101(2). The server 110(1) is a multi-tenant system providing a multi-tenant application 114(1) to customers 101(1) and 101(2) (i.e., tenants) configuring customized notifications on the server application 114(1) using one multi-tenant database 113(1) for their own users 130. The multi-tenant database 113(1) could be one database that is shared among both customers, and each customer, i.e. tenant as referred here, only has visibility into their own data within the database, in accordance with an embodiment. For example, customer 101(1), acting as administrator 1, defines customized notification and appended actions for its users 141(1)-130(10), to receive from the multi-tenant server 110(1) through server application 114(1). Customer 101(2), acting as administrator 2, defines customized notification and appended actions for its user 141(11)-(50), to receive from the same multi-tenant server 110(1) through the same server application 114(1). The customized configuration is separate from every other customer's configuration. And moreover, users 141(1)-(50) may use the same application 133(1) on their mobile device 130 to receive corresponding customized push notifications and appended actions from the multi-tenant server from different customers respectively. The user application 133(1) could be same as server application 114(1), which has more administrator controls over the content, application, and/or functions accessible by different customers.

Additionally, the server 110 and the user device 130 may communicate via a communication network(s) 120. The communication network(s) 120 may include any or all of a private network, personal area network (PAN), Local-Area Network (LAN), Wide-Area Network (WAN), mobile communication network, or the Internet. Further, the connection between the server 110, the user device 130, and the communication network(s) 120 may be a wireless connection (e.g., Bluetooth, Wi-Fi connection, etc.), or a wired connection (e.g., Ethernet, universal serial bus (USB), etc.), or a combination thereof.

As illustrated in FIG. 1, in some embodiments, for example, customer 101(1) and customer 101(2) may want to inform their own users 141 about different unique events. The customer 101(1) may customize a multi-tenant server application 114(1) in a multi-tenant server 110(1) to form a customer-defined notification and a customer-defined action using its own customer information and user information stored in a multi-tenant database 113(1). Customer 101(2) could customize the same server application in the same multi-tenant server its own notifications and actions using its own customer and user information stored in the same database separately. When the occurrence of any event is detected, the notification and the action are sent to corresponding users 141 through mobile networks(120). After user 141(1) get the customer-defined notification and customer-defined action, an application 133(1) could present the notification and action to the screen of users' mobile phone. User 141(1) could respond to the customized action on the screen of the mobile phone. After server 110(1) receives the user selected action through mobile network(s) 120, the user selected action is executed. As referred herein, the server 110(1) could be the same cloud server that is used by other customers, and the server application 114(1) could be the same server application used by other customers. In accordance with an embodiment, the notification is provided only to users of that particular customer group (i.e., within a single tenant of a multi-tenant cloud server). And, in this embodiment this notification is received only by those users of the particular customer group, even though all users 141 have the same version of application 133(1) on their mobile phone. One customer's notification goes to its own users, and a different customer's notifications goes to its own users. As a result, an individual tenant of the multi-tenant server 110(1) can provide entirely customized notifications to its users despite sharing the same platform with other tenants.

FIG. 2 is a flow chart 200 illustrating an example for sending interactive customized push notifications with customized actions, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In an embodiment, at 210, occurrence of an event associated with an object is determined by server 110. An event may be a record change in database 113, a platform event, a process change invoked by another process, or any event that is associated with an object. An object may be an account, a process, a set of records or anything specific for user 141 that customer 101 want to inform. For example, a customer 101(1) may want to notify its user 141(1) when solar panel malfunctions at living blue account. The user 141(1) may sell living blue company one type of solar panel previously, and he would be notified if anything happens to the solar panel in living blue company. In this example, the object would be the account, and the unique event for user 141(1) is solar panel malfunction at living blue account. When the criteria of solar panel malfunction is met, the occurrence of the event associated with the account object is determined. In another example, customer 101(2) may want to notify its user 141(2) when opportunity X is "closed won", which means that the opportunity X is closed, and is won, i.e. the sale was made. User 141(2) is working on this opportunity X and trying to make the sale. Therefore user 141(2) would expect to be notified if opportunity X is closed won. As referred to in this example, the object would be the opportunity, and the unique event for user 141(2) would be opportunity X closed won. When the criteria of closed won is met, the occurrence of the event associated with the opportunity object is determined. In these examples, the event is associated with the object. And the records of the object may be stored in a multi-tenant database 113(1). The criteria of that event may be set up by customer 101(1) and customer 101(2) in a multi-tenant server application 114(1) on a multi-tenant server 110(1). Although customer 101(1) and customer 101(2) use the same multi-tenant database, server application and server, the record of each customer and the configuration set up by each customer are separate and independent. And the occurrence of any event is determined respectively when corresponding criteria is met.

In some embodiments, server application 114(1) may set up an event handler or event listener to detect when the criteria is met, and determine the event occurs. In some embodiments, server application 114(1) may get information from an application programming interface (API), which is used to collect data outside of database 113(1) and server application 114(1), to detect whether the criteria is met and therefore determine if the event occurs. In some embodiments, an API may collect data outside of database 113(1) and server application 114(1) and determine the occurrence of an event. When the API detects occurrence of the event that the customer 101(1) want to notify the user 141(1), the API can send to server application 114(1) the determination as well as the data that user device 130(1) needs to be notified.

At 220, a customized notification associated with the event is formed when the occurrence of the event is determined. For example, when the server application 114(1) determines that the solar panel malfunctions at living blue account, a push notification of "Solar panel malfunction at Living Blue Account" configured by customer 101(1) will be formed for user 141(1). And when the server application 114(1) determines that opportunity X is closed won, a push notification of "Opportunity X is closed won" defined by customer 101(2) will be formed for user 141(2). However, for conventional push notifications, users usually get systematic notifications same as everyone else or self-notifications defined by themselves. The customers can't define the notifications for their users that they want to inform their users.

In some embodiments, the push notification may have a variable part and use one or more fields from the object. A filed may be an attribute, a record, or a part of the object. For example, "solar panel malfunction" and "living blue" may be some fields from the object "account", and "opportunity X" and "closed won" may be some fields from the object "opportunity". The push notification may also have a fixed part with fixed text message, such as "Important notice", or "Congratulations". In some other embodiments, the push notification may be defined default and all have fixed test message.

At 230, a list of actions associated with the event is determined following the notification. For example, for a push notification of "Solar panel malfunction at living blue account", customer 101(1) may need user 141(1) to order replacement part for the solar panel, or call the CEO of the living blue account. And for a push notification of closed won for opportunity X, customer 101(2) may need user 141(2) to send email to the assistant who last modified the record to congratulate to the assistant. These actions may be appended to the push notifications and sent to user 141(1) and user 141(2) respectively through network(s) 120 for user 141(1) and 141(2) to respond respectively.

In some embodiments, the action may have a variable part and use one or more fields from the object. For example, the contact information of the living blue account, such as CEO name Jennifer West and phone number, may be obtained from a field of the object "account" and used to form the appended action for user 141(1) "Call Jennifer West". Or the assistant name, such as Allen East, may be obtained from a field of the object "opportunity" and used to for the appended action for user 141(2) "Congrats to Allen East". The action may also have a fixed part with fixed text message, such as "Call", or "Congrats to". In some other embodiments, the action may only have fixed default actions or test message, such as "order replacement part". In conventional push notifications and appended actions, users can't be notified for each of themselves of specific events that the customers want to notify their users. And the appended actions for users are usually a default list to choose from and the default list is the same for every user. With this customized notifications and customized appended actions, it's much easier to customer to notify their users of specific event and also much easier for the users respond to the notifications by specific appended actions.

At 240, an action link with enough information to execute the action is associated with the action. As referred to herein, an action link may be an endpoint that has all the data and information in the database on the server to be capable of executing and finishing the action on the server side. For example, an action link may have the solar panel order information, such as the solar panel part number, shipping address and payment information, for the solar panel order replacement in database 113(1). And this action link is associated with the appended action of "Order replacement part". When user 141(1) selects this action "Order replacement part" on his mobile phone, the selection could be sent back to server application 114(1) on server 110(1). The server application 114(1) may locate the action link in database 113(1) and order the replacement solar panel with the information in the action link. Similarly, an action link may have the assistant name Allen East and email information in database 113(1). And this action link is associated with the action of sending congratulation email to Allen East. When user 141(2) selects this action "Congrats to Allen East" on his mobile phone, the selection could be sent back to server application 114(1) on server 110(1). The server application 114(1) may locate the action link in database 113(1) and send congratulation email to Allen East with the information in the action link.

At 250, the notification and the action list are presented to a user device associated with the event. For example, notification "Solar panel malfunction at Living Blue Account" with actions "Call Jennifer West" and "Order replacement part" may be sent from multi-tenant server application 114(1) through network(s) 120 to a user 114(1) associated with the event, and are presented on the user's device 130(1). And notification "Opportunity X is closed won" with action "Congrats to Allen East" are also sent from server application 114(1) through network(s) 120 to a user 114(2) associated with the event, and are presented on the user's device 130(2). User 114(1) and 114(2) may receive the specific notification and respond to the specific actions for each of them by select one of the options on their user devices respectively, even though they may use the same multi-tenant server application and the same user application, as the notifications and appended actions are set up by each of their customer separately and independently on the multi-tenant server. In some embodiments, more than one user device may be associated with one user, for example, a mobile device, a computer, a smart watch, and/or a smart pad. With one customized notification set up in server application 114(1), all the devices that associated with the event could be sent that customized notification and appended actions. And the push notification and appended action history could be saved and reviewed on each user device.

At 260, the action selected by user is executed by the action link. For example, in response to user 141(1)'s selection of "Call Jennifer West", the selection is sent back to multi-tenant server application 114(1), and the phone call to Jennifer West is initiated immediately on user device 130(1) with the phone information from the action link corresponding to the action. And for user 141(1)'s selection of "Order replacement part", the selection is sent back to server application 114(1), and solar panel replacement part is ordered with all the information from the action link corresponding to the action. And for user 141(2)'s selection of "Congrats to Allen East", the selection is sent back to multi-tenant server application 114(1), and an email is sent to Allen East with all the information from the action link corresponding to the action. Without these customized notifications and appended actions, the customers can't define the notifications and actions for their users to notify the events that they want to inform their users. And the users could only get systematic notifications and default list of actions which are the same as others.

Figures 3A, 3B:
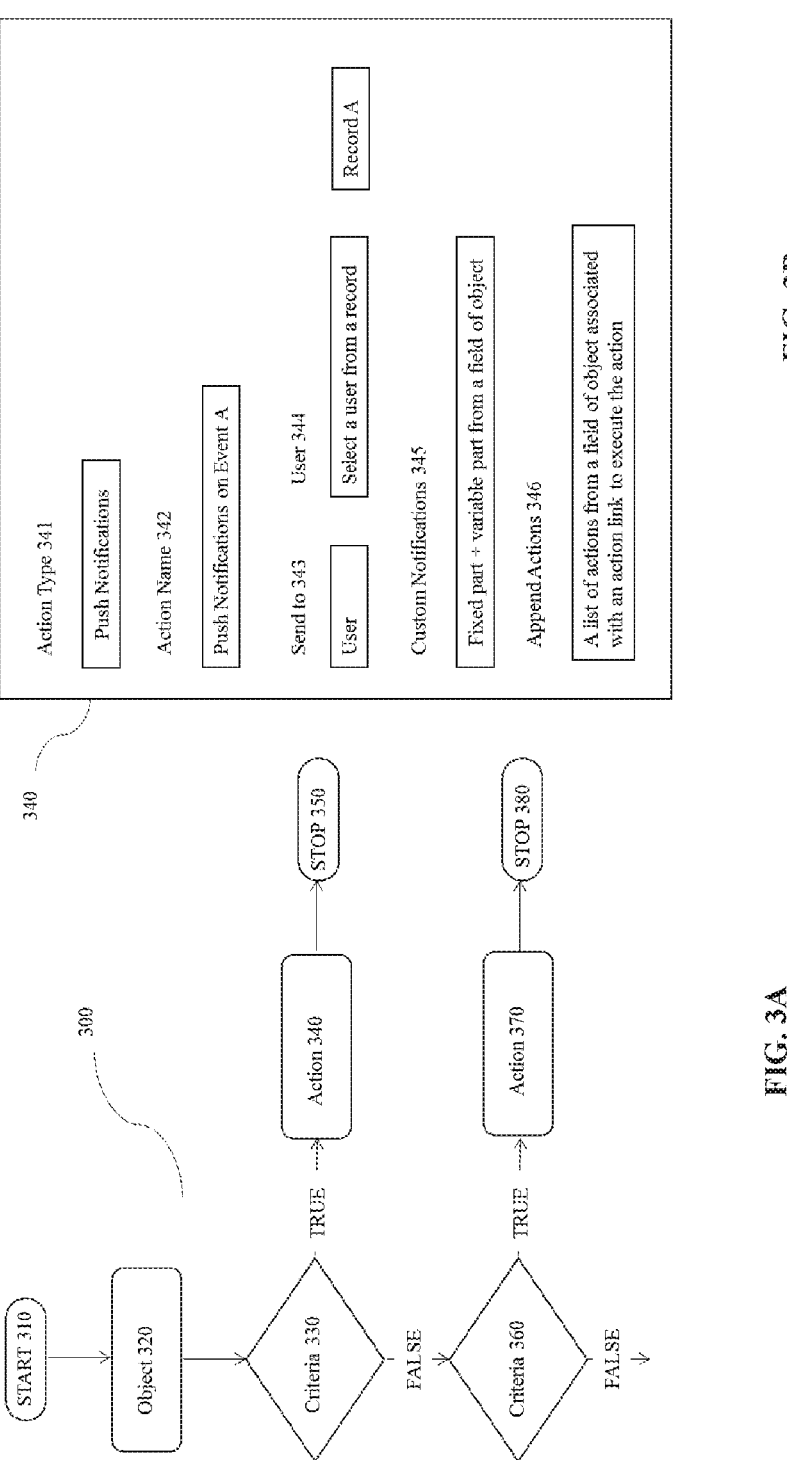
FIGS. 3A and 3B are block diagrams illustrating example operations for setting up an interactive customized push notifications with customized actions, according to some embodiments.

FIGS. 3A and 3B are block diagrams illustrating example operations for setting up an interactive customized push notifications with customized actions, according to some embodiments. As illustrated in FIG. 3A, method 300 of setting up an interactive push notification with customized actions comprises start 310, object 320, criteria 330, action 340, stop 350, criteria 360, action 370 and stop 380. It is to be appreciated that not all steps may be needed to perform the disclosure provided herein, and it's also possible that more steps, such as more criteria and action steps, may be needed to perform the disclosure provided herein. Further, some of the steps may be performed simultaneously, or in a different order than shown in FIG. 3A, as will be understood by a person of ordinary skill in the art. Method 300 shall be described with reference to FIG. 1. However, method 300 is not limited to the example embodiments. Additionally, the function of setting up interactive customized push notifications and actions may be only required to update for server application on the server. And the user application on user device may not need to update with a new version. Moreover, in some embodiment, setting up interactive customized push notifications and actions may also works on an customized server application, wherein the customized server application may be a cloned copy of the server application, for example, a customized server application for home depot.

In some embodiments, customer 101 may set up an object 320 that the customer wants to inform user 141 in multi-tenant server application 114 in multi-tenant server 110 when a criteria 330 is met. For example, customer 101(2) wants to inform user 141(2) that a record of opportunity X in opportunity object is "closed won", which means that the opportunity is closed, and is won, i.e. the sale was made. The "closed won" is the criteria to determine the occurrence of the event. The actions for the event may be sending user 141(2) customized push notification and/or appended actions associated with the event. More criteria and actions, such as criteria 360 and action 370, could continue if criteria 330 is not met.

FIG. 3B illustrates the setup of action 340, comprising action type 341, action name 342, send to 343, user 344, custom notification 345, and append action 346. As referred to herein, a custom notification may be a customer-defined fixed notification, a variable customized notification using a field from the object 320, or a combination thereof. Similarly, an append action 346 may be a fixed global action, a variable customized action using a field from object 320, or a combination thereof. Further, the global action may be selected from a global action list. The actions in the global action list could be independent of the records in object 320 and be copied and used by customer directly, or the actions could also be modified and defined by customer. For example, after the criteria 330 close won is met, a push notification action with appended action is defined. The action type 341 would be push notification, and the action name would be determined by customer 101(2). The push notification may be sent to user 141(2), same as user 344 defined in FIG. 3B.

In some embodiments, the user 141(2) could be defined by user name, and thus every notification would be sent to the same user. In some other embodiments, the user 141(2) may be defined using a filed from the object 320, which may be different for different records of opportunity object, such as the assistant who last modified opportunity X's closed won record.

For custom notification 345, customer 101(2) may use customer-defined fixed notification, such as "Congratulations for opportunity closed won", or a variable customized notification using a field from opportunity object 320 or a combination of a fixed part and a variable part, such as "Congratulations! We just closed won [opportunity name]". Similarly, the appended action 346 could be a fixed global action, a variable action using a field from opportunity object 320 related to the event, or a combination thereof, such as "Congrats to [the assistant who last modified opportunity X's closed won record]". And the action is associated to an action link which has enough information to execute the action on the server 110(2). For example, the action link for action "Congrats to [the assistant who last modified opportunity X's closed won record]" may have the assistant's email and could send the assistant an email about the event "Opportunity X is closed won" if the appended action is selected by user 141(2).

In some embodiments, the push notifications 345 and appended actions 346 may be localized according to the user's information in database 113(1). For example, if user 141(2) is not an English speaker, the push notifications and appended actions may be translated and presented to user 141(2) the translated version that user 141(2) understands. In some embodiments, the notifications and appended actions may be routed to other user applications on user device 130(2) that are capable of receiving and handling the notifications and actions. And the routing could be defined by the notification type on a different screen. Additionally, the notification type could be a standard notification type, a customized notification type or a combination thereof. The customer could override the standard notification type with a customized notification type.

Figure 4B:
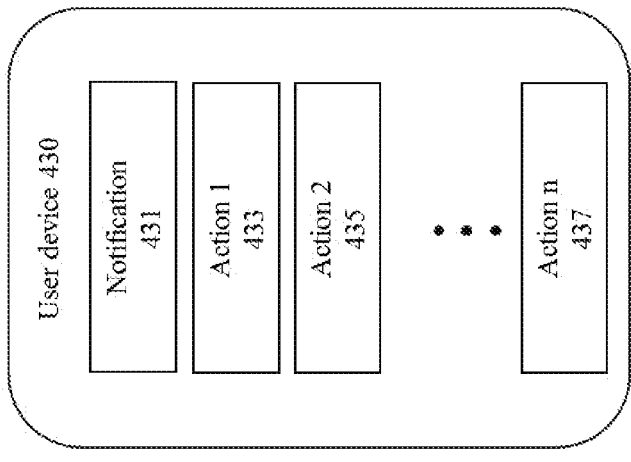
FIGS. 4A and 4B depict example graphical user interfaces (GUI) for presenting an interactive push notification with customized action to a user device, according to embodiments of the present disclosure.
Figure 4A:
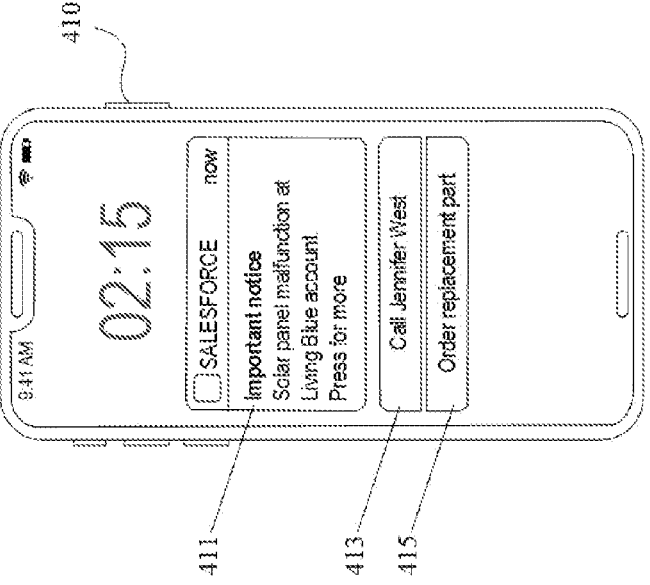

FIGS. 4A and 4B illustrate example graphical user interfaces (GUI) for presenting an interactive push notification with customized action to a user device, according to embodiments of the present disclosure. FIG. 4A displays a graphical representation 410 of a push notification 411 and two appended customized actions 413 and 415. In response to the actions, user's tap selection of action 413 will immediately initiate a phone call to Jennifer West, CEO of living blue account, and selection of action 415 will reorder the replacement part for malfunctioned solar panel on a server, according to the information in an action link corresponding to the event. It is to be appreciated that not all items may be needed to perform the disclosure provided herein, and it's also possible that more items, such as more appended actions in FIG. 4B, may be needed to perform the disclosure provided herein. Further, some of the items may be placed in a different order than shown in FIGS. 4A and 4B, as will be understood by a person of ordinary skill in the art.

Various embodiments may be implemented, for example, using one or more well-known computer systems, such as server 110 and user device 130 shown in FIG. 1. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/ any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Figure 5:
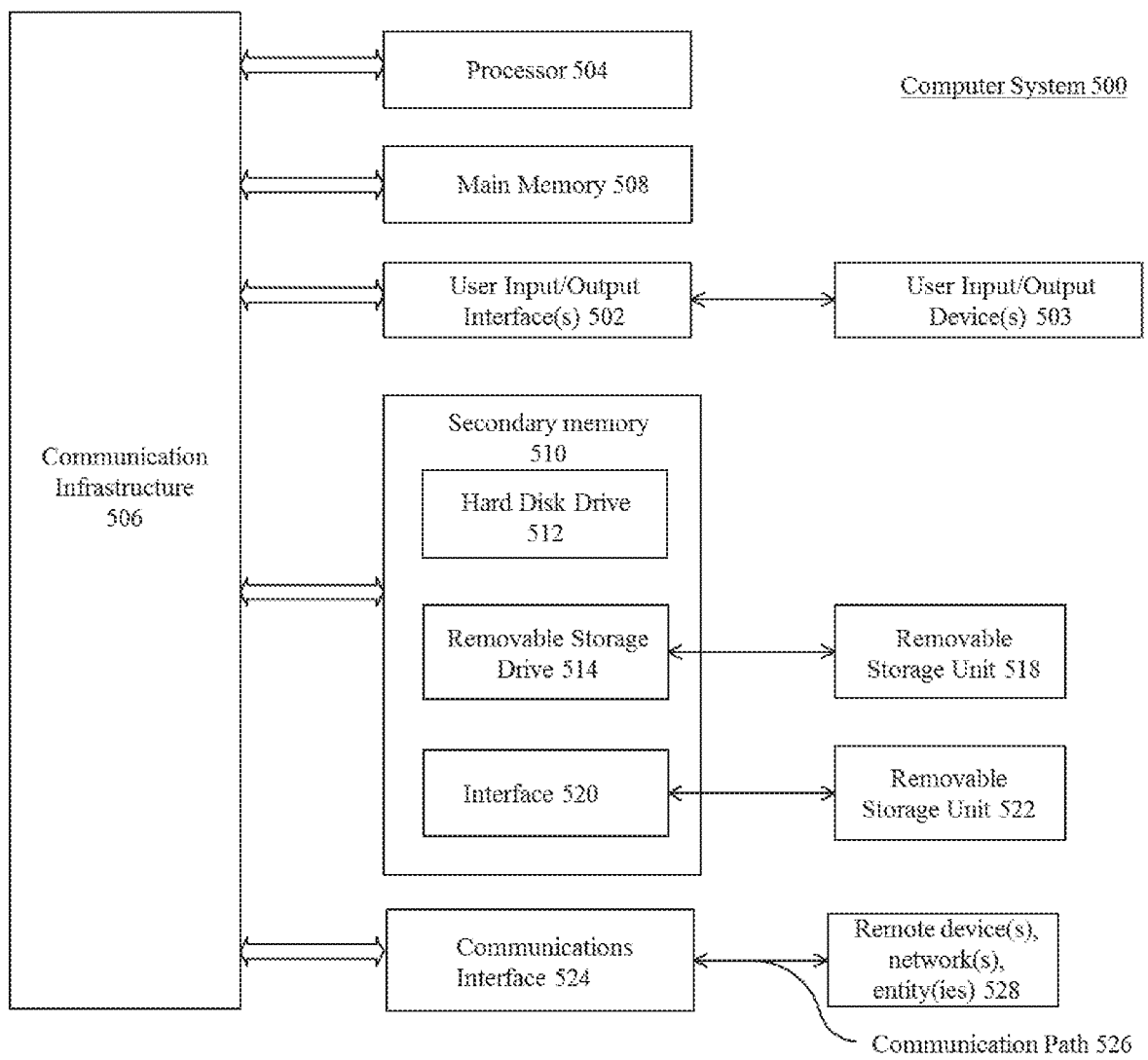
FIG. 5 is an example computer system useful for implementing various embodiments.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

forming, by one or more processors, a notification message of an event corresponding to a record change in an object associate with a tenant of a multi-tenant application for presentation to a user of a client application, wherein:

the client application is an instance of the multi-tenant application;

the object includes a record with first and second fields predefined by the tenant;

the notification message includes the event of the record change in the object; and the notification message includes a first fixed part having a first fixed message and a first variable part defined by the tenant in the multi-tenant application using the first field of the object to manage interactions between the tenant and the user;

forming, by the one or more processors automatically in response to occurrence of the event, an action message comprising a list of actions responsive to the event associated with the notification message, wherein each of the list of actions includes a second fixed text part having a second fixed message and a second variable text part defined by the tenant using the predefined second field from the object associated with the event, and wherein each of the list of actions are formed automatically in response to the event of the record change in the notification message;

associating, by the one or more processors, an action link with the action message, wherein the action link comprises a set of information corresponding to the second variable text part for the user to execute the list of actions according to the action message in response to the event; and sending, by the one or more processors, the notification message and the action message as a push notification to the client application on a device of the user for the user to respond to the record change, wherein:

the device displays the notification message and the action message on a lock screen of the device automatically in response to receiving the push notification without displaying the client application; and in response to a user selection of one of the list of actions, the selected action is executed automatically to respond to the record change using information in the action link that is stored in a database and related to the predefined second field of the object.

2. The method of claim 1, wherein the occurrence of the event is determined by a criteria defined by the tenant using a third field from the object associated with the event.

3. The method of claim 1, wherein the occurrence of the event is determined by the one or more processors using an application programing interface (API).

4. The method of claim 1, further comprising receiving an indication of the user selection of the one of the list of actions via the device.

5. The method of claim 4, further comprising when receiving the indication executing the selected action with a phone call or an email using the information in the action link corresponding to the second variable text part.

6. The method of claim 1, wherein the device is one of a group of devices defined by the tenant according to a rule associated with the object.

7. A system, comprising:

a memory; and at least one processor coupled to the memory and configured to:

form a notification message of an event corresponding to a record change in an object associated with a tenant of a multi-tenant application for presentation to a user of a client application, wherein:

the client application is an instance of the multi-tenant application;

the object includes a record with first and second fields predefined by the tenant;

the notification message includes the event of the record change in the object; and the notification message includes a first fixed part having a first fixed message and a first variable part defined by the tenant in the multi-tenant application using the first field of the object to manage interactions between the tenant and the user;

form, automatically in response to occurrence of the event, an action message comprising a list of actions responsive to the event associated with the notification message, wherein each of the list of actions includes a second fixed text part having a second fixed message and a second variable text part defined by the tenant using the predefined second field from the object associated with the event, and wherein each of the list of actions are formed automatically in response to the event of the record change in the notification message;

associating, by the at least one processor, an action link with the action message, wherein the action link comprises a set of information corresponding to the second variable text part for the user to execute the list of actions according to the action message in response to the event; and send the notification message and the action message as a push notification to the client application on a device of the user for the user to respond to the record change, wherein:

the device displays the notification message and the action message on a lock screen of the device automatically in response to receiving the push notification; and in response to a user selection of one of the list of actions, the selected action is executed automatically to respond to the record change using information in the action link that is stored in a database and related to the predefined second field of the object.

8. The system of claim 7, wherein the occurrence of the event is determined when the event satisfies a criteria defined by the tenant using a third field from the object associated with the event.

9. The system of claim 7, wherein the occurrence of the event is determined by the at least one processor using an application programing interface (API).

10. The system of claim 7, wherein the at least one processor is further configured to receive an indication of the user selection of the one of the list of actions via the device.

11. The system of claim 10, wherein the at least one processor is further configured to execute the selected action with a phone call or an email using the information in the action link corresponding to the second variable text part.

12. The system of claim 7, wherein the device is one of a group of devices defined by the tenant according to a rule associated with the object.

13. A non-transitory computer-readable apparatus having instructions stored thereon that, when executed by one or more processors coupled to a memory, cause the one or more processors to perform operations comprising:

forming a notification message of an event corresponding to a record change in an object associated with a tenant of a multi-tenant application for presentation to a user of a client application, wherein:

the client application is an instance of the multi-tenant application;

the object includes a record with first and second fields predefined by the tenant;

the notification message includes the event of the record change in the object; and the notification message includes a first fixed part having a first fixed message and a first variable part defined by the tenant in the multi-tenant application using the first field of the object to manage interactions between the tenant and the user;

forming, automatically in response to occurrence of the event, an action message comprising a list of actions responsive to the event associated with the notification message, wherein each of the list of actions includes a second fixed text part having a second fixed message and a second variable text part defined by the tenant using the predefined second field from the object associated with the event, and wherein each of the list of actions are formed automatically in response to the event of the record change in the notification message;

associating, by the one or more processors, an action link with the action message, wherein the action link comprises a set of information corresponding to the second variable text part for the user to execute the list of actions according to the action message in response to the event; and sending the notification message and the action message as a push notification to the client application on a device of the user for the user to respond to the record change, wherein:

the device displays the notification message and the action message on a lock screen of the device automatically in response to receiving the push notification; and in response to a user selection of one of the list of actions, the selected action is executed automatically to respond to the record change using information in the action link that is stored in a database and related to the predefined second field of the object.

14. The non-transitory computer-readable apparatus of claim 13, wherein the occurrence of the event is determined when the event satisfies a criteria defined by the tenant using a third field from the object associated with the event.

15. The non-transitory computer-readable apparatus of claim 13, wherein the occurrence of the event is determined by the one or more processors using an application programing interface (API).

16. The non-transitory computer-readable apparatus of claim 13, further comprising receiving an indication of the user selection of the one of the list of actions via the device.

17. The non-transitory computer-readable apparatus of claim 16, further comprising executing the selected action with a phone call or an email using the information in the action link corresponding to the second variable text part.

18. The method of claim 1, wherein the device includes a mobile device, and wherein the notification message and the action message are displayed on the lock screen of the mobile device.

19. The system of claim 7, wherein the device includes a mobile device, and wherein the notification message and the action message with the list of actions are displayed on the lock screen of the mobile device.

20. The non-transitory computer-readable apparatus of claim 13, wherein the device includes a mobile device, and wherein the notification message and the action message with the list of actions are displayed on the lock screen of the mobile device.

* * * * *